Figure 1:
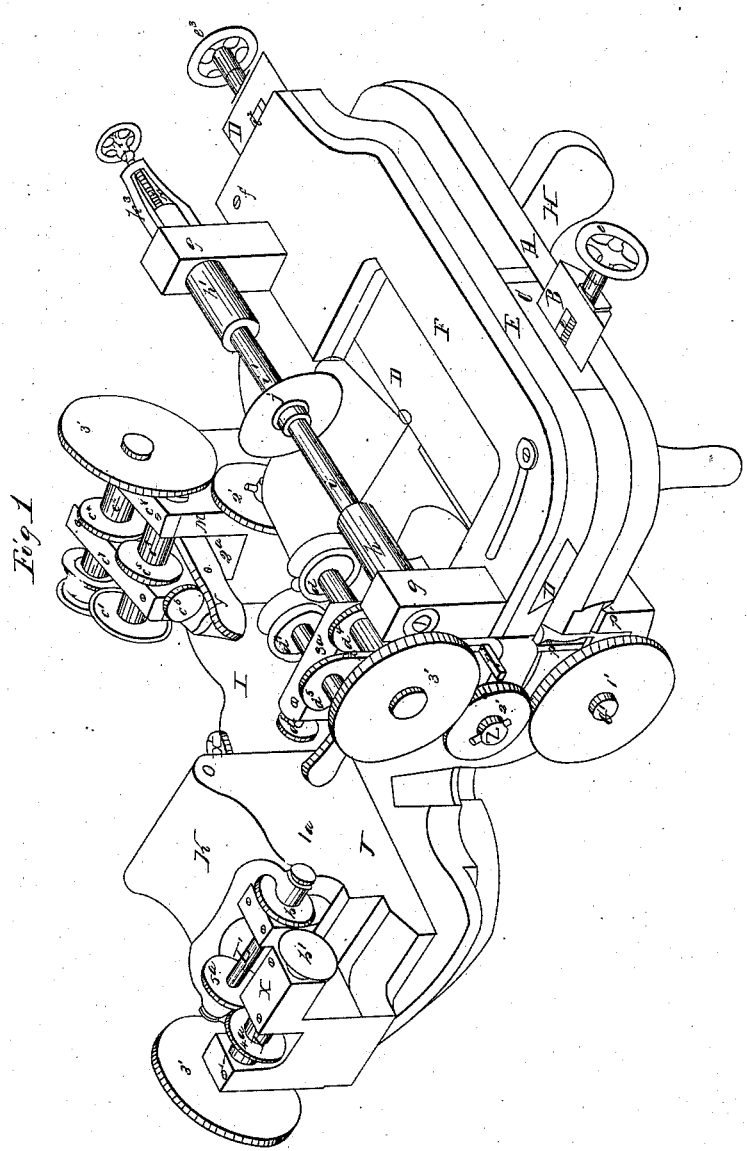

O. W. Minard,

Making Sheet-Metal Articles.

Nº 15,772.    Patented Sep. 23, 1856.

Inventor.
O W Minard

2 Sheets—Sheet 2.
O. W. Minard.
Making Sheet-Metal Articles.
Nº 15,772. Patented Sep. 23, 1856.
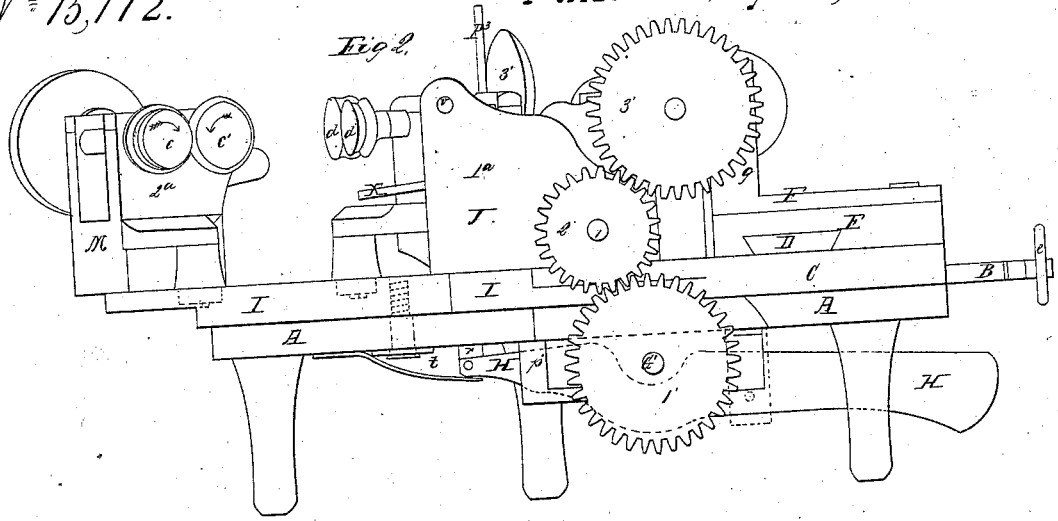
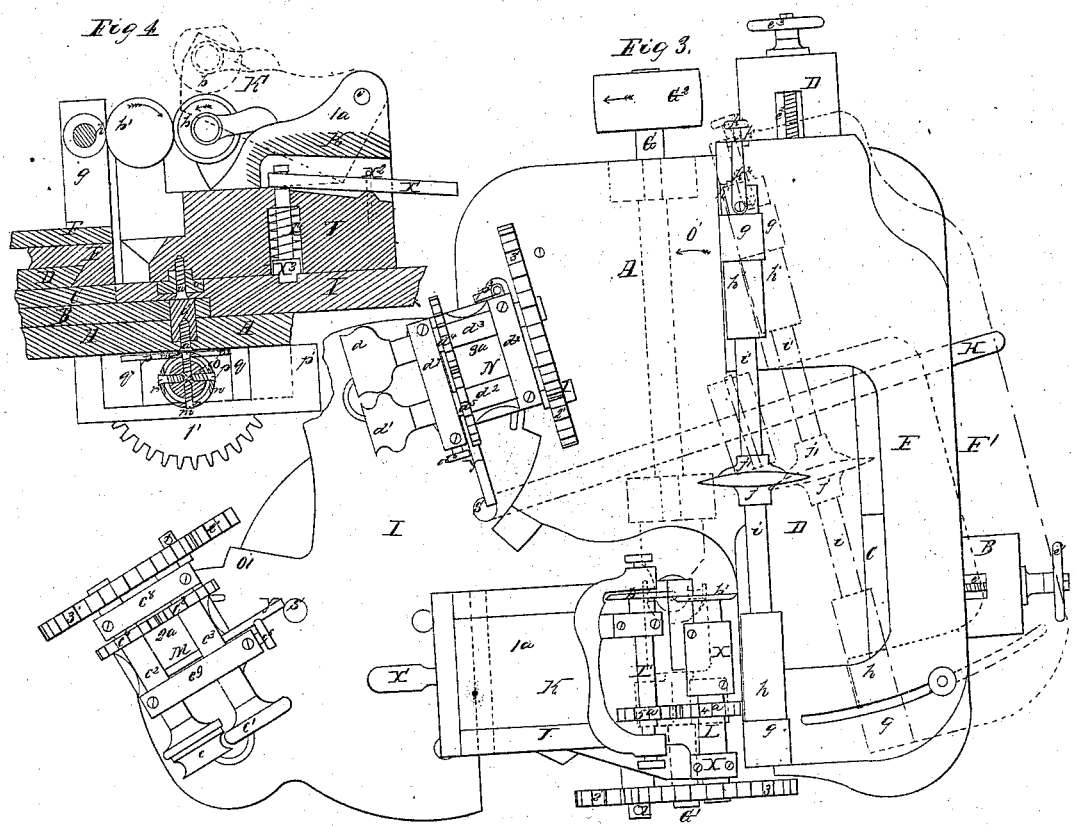
Inventor.
O. W. Minard

UNITED STATES PATENT OFFICE.

O. W. MINARD, OF WATERBURY, CONNECTICUT.

IMPROVEMENT IN MAKING BRASS KETTLES.

Specification forming part of Letters Patent No. 15,772, dated September 23, 1856.

*To all whom it may concern:*

Be it known that I, O. W. MINARD, of Waterbury, in the county of New Haven and State of Connecticut, have invented a new and Improved Machine for Trimming and Wiring Kettles and other Articles; and I do hereby declare that the following is a full, clear, and exact description of the same, reference being had to the annexed drawings, making a part of this specification, in which—

Figure 1 is a perspective or isometrical view of the machine. Fig. 2 is a vertical elevation of the same. Fig. 3 is a plan or horizontal view of the machine. Fig. 4 is a detached vertical elevation of the shears 1ª, with a part of the plates, &c., of which the holder-carriage is composed. Some of the parts are in section, to show the internal arrangement of the pivots, levers, &c.

The same letters and characters of reference indicate the same parts in all the figures.

The nature of my invention consists in the improvement of machinery for cutting rings and washers from disks of metal.

The first part of the improvement consists in mounting one of the cutter-shafts on a separate piece of metal, and hinging said piece to the frame of the shears in such a manner that one of the cutters can be easily removed and quickly and accurately replaced when desired.

The second part of my invention relates to the construction of shears with the clamps hinged or pivoted to the frame of the shears or to a bed-plate in such a way that the axes of the clamp-mandrels can be adjusted to any desired angle with the axes of the cutter-shafts, in the way and for the purpose hereinafter described.

In the drawings, A represents a horizontal bed-plate, on the upper surface of which is attached the piece B by the screw $a$ and the pin $a'$. The axis of the pin is perpendicular to the surface of the bed-plate. The piece B pivots on the pin $a'$, which is located directly under the cutting-point of the shears when they are in a working position. The plate B is a dovetailed piece, and the piece C slides on it, (by the action of the screw $e$, (to set the clamp-mandrels at any desirable distance from the cutters to accommodate the different-sized vessels required to be trimmed. C has a dovetailed piece, D, fastened to its upper surface, on which the piece E slides. The dovetail piece D is at right angle to the piece B. The top slide is to adjust the top of the vessel a proper distance beyond the edges of the cutters preparatory to trimming. The plate F rests on the piece E, and swings on a pivot, $f$. (See Fig. 1.) Said plate F can be swung to position F', as shown by dotted lines. (See Fig. 3.) On the plate F are fastened the stands which support the mandrels and the clamps, and in which the mandrels revolve. Under side of the bed-plate A is the main shaft G, which is coupled together with a coupling known as "Hook's universal joint." The axes of the joints are directly under the axis of the pin $a'$. (See Fig. 4.) P represents a box in which the end G' of the main shaft revolves. Said box can traverse through the opening $g\,g$ in the piece P'.

To the box P is fastened the plate P², through which the connecting-pin P³ passes when the shears are connected with the main shaft. To the opposite end of the main shaft is attached the pulley G², by which motion is communicated to the gear 1'. Said gear meshes into the gear 2', which communicates motion to the shears when they are in a working position. The lever H is hinged to a piece which is fastened to the under side of the bed-plate. The pin which is attached to the small end of the lever passes through the bed-plate into suitable holes made in the revolving table to stop and hold the table when the shears are brought to the proper place to operate on an article while held in the clamps for that purpose.

I represents a revolving table, which is placed in a horizontal position and revolves on the bed-plate A, and is held in its place by the screw $t$.

J represents the frame of the shears, to which the journals are attached that carry the cutter-shaft L. Said frame rests on and is pivoted to the revolving table I.

K represents a piece which is hinged to the frame J at $v$. Said piece can be put in position K', as shown by dotted lines. (See Fig. 4.) To this piece K are attached the box and screws that support and carry the cutter-shaft L'. (See Figs. 1 and 3.) The lever $x'$ lifts the pin $x^3$, when desired, by being pressed down on its outer end. When the pressure is removed from the end of the lever, the spring in the open space $x^4$ presses down the pin $x^3$ against the revolving table, ready to enter a hole and stop, and hold the shears when they are brought into line with the main shaft.

To trim a sheet of metal and cut it into rings, the metal should be placed between the clamps, and the axes of the clamp-mandrels should be placed at an angle of ninety degrees with the axes of the cutter-shafts, which will bring the plane of the metal to a right angle with the face of the shears, and the hinged piece K should be lifted to position K', and the part of the metal to be trimmed off should be inserted beyond the edges of the cutters by turning the screws $e$. Then the piece K should be brought back to bring the cutters $b'$ to a cutting position and the shears started. The article held between the clamps will revolve, and be trimmed by being in contact with the cutters while they are in motion. Now, the hinged piece should be lifted as before, and the periphery of the metal inserted beyond the edge of the cutters by turning the screw $e$. Then bring back the hinged piece and start the machine, as before. The result of the last operation will be the cutting of a ring or washer from the edge of the metal. The width of the washer will be equal to the distance the edge of the metal was inserted beyond the edge of the cutters. This treatment may be continued until the disk of metal is all cut into rings or washers except the part between the clamps.

To trim a vessel with its top at right angle with its sides, the bottom of the vessel should be placed between the clamps, and the axes of the clamp-mandrels should be in a line parallel with the axes of the cutter-shafts, and the top of the vessel inserted by the action of the screw $e^2$, which operates the top slide. Then put the shears in motion as before.

To trim vessels with their sides at an angle less than ninety degrees with the top, after the bottom of the article has been placed between the clamps the axes of the clamp-mandrels should be adjusted to any angle with the axes of the cutter-shafts that may be found necessary to bring the side of the vessel nearest the shear-blades parallel, or nearly so, with the axes of said cutter-shafts. This may be accomplished by swinging the piece B on the pivot $a'$, and the plate F can be swung to position F', and if this will not give sufficient angle the shears may be swung on the stud $u$, that pivots the frame of the shears to the revolving table, the universal joint in the main shaft accommodating itself to the angle, and the cutting performed as before described.

What I claim as new, and desire to secure by Letters Patent, is—

The use of rotary shears or cutters having a hinged or sliding piece constructed and operating as described, to carry one of the shafts and one of the cutters from a cutting position, and to quickly and accurately replace it when desired.

O. W. MINARD.

Witnesses:
FRANKLIN L. WELTON,
JAS. P. GOODWIN.